US006499627B2

(12) United States Patent
Arai

(10) Patent No.: US 6,499,627 B2
(45) Date of Patent: Dec. 31, 2002

(54) AUTOMATIC VENDING MACHINE

(75) Inventor: Toru Arai, Ageo (JP)

(73) Assignee: Sanden Corp. (JP)

( * ) Notice: Subject to any disclaimer, the term of this patent is extended or adjusted under 35 U.S.C. 154(b) by 0 days.

(21) Appl. No.: 09/871,647

(22) Filed: Jun. 4, 2001

(65) Prior Publication Data

US 2001/0048000 A1 Dec. 6, 2001

(30) Foreign Application Priority Data

Jun. 5, 2000 (JP) ....................................... 2000-167103
Jun. 5, 2000 (JP) ....................................... 2000-167111

(51) Int. Cl.[7] .......................... B65G 59/00; G07F 11/00

(52) U.S. Cl. ........................ 221/130; 221/131; 221/195; 221/236; 221/253

(58) Field of Search ................................ 221/130, 133, 221/123, 191, 192, 195, 236, 237, 253, 193, 258, 261, 131

(56) References Cited

U.S. PATENT DOCUMENTS

| | | | | | |
|---|---|---|---|---|---|
| 4,252,250 | A | * | 2/1981 | Toth | 221/195 |
| 6,199,720 | B1 | * | 3/2001 | Rudick et al. | 221/131 |
| 6,357,621 | B1 | * | 3/2002 | Vidondo | 221/133 |

FOREIGN PATENT DOCUMENTS

| | | | | |
|---|---|---|---|---|
| JP | 0246698 | * | 10/1989 | 221/130 |
| JP | 0253093 | * | 10/1989 | 221/130 |
| JP | 402016698 | * | 1/1990 | 221/192 |
| JP | 0069894 | * | 3/1990 | 221/192 |
| JP | 0011494 | * | 1/1991 | 221/192 |
| JP | 0067387 | * | 3/1991 | 221/192 |
| JP | 10-302139 | | 11/1998 | |
| JP | 10-302140 | | 11/1998 | |

* cited by examiner

*Primary Examiner*—H. Grant Skaggs
(74) *Attorney, Agent, or Firm*—Banner & Witcoff, Ltd.

(57) ABSTRACT

To provide an automatic vending machine capable of preventing, at the time of carrying out a commodity from a commodity column to a commodity receptor, the commodity from falling down due to a change in posture of the commodity, and mitigating falling shock of the commodity. When the commodity is carried out of the commodity column to the commodity receptor, the commodity is caused to abut on a commodity supporting member located on one side of the commodity receptor, and the commodity is moved toward the other end side of the commodity receptor with the commodity supporting member abutted thereon, whereby the commodity is received by the commodity receptor while the commodity is being supported by the commodity supporting member. Therefore, it is possible to reliably prevent the contents from being damaged due to falling down or falling shock caused by a change in posture of the commodity during carrying-out.

17 Claims, 10 Drawing Sheets

AUTOMATIC VENDING MACHINE

BACKGROUND OF THE INVENTION

1. Field of the Invention

The present invention relates to an automatic vending machine capable of selling commodities having various shapes and sizes such as beverages enclosed in a can, a bottle, a plastic bottle , a paper carton or the like, and dairy products and confectionery contained in a predetermined container such as a cup.

2. Description of the Related Art

Conventionally, as automatic vending machines of this kind, there has been known an automatic vending machine having, as disclosed in, for example, Japanese Patent Laid-Open No. 10-302140, a vending machine body having a commodity outlet port in a lower part of the front surface; a plurality of commodity columns arranged in a widthwise direction and in an up-and-down direction of the vending machine body; a commodity bucket arranged ahead of each commodity column so as to be able to move in the widthwise direction and in the up-and-down direction of the vending machine body; and a moving mechanism for moving the commodity bucket in the widthwise direction and in the up-and-down direction of the vending machine body.

In this automatic vending machine, when a commodity is selected, the commodity bucket is moved to a commodity column corresponding to the selected commodity by means of the moving mechanism, and the commodity in the commodity column is pressed from behind by a pressing member to be carried out into the commodity bucket, the commodity bucket, which has received the commodity, is moved to the commodity outlet port by means of the moving mechanism so that the commodity of the commodity bucket is carried out into the commodity outlet port.

In the above-described automatic vending machine, however, at the time of carrying out the commodity of the commodity column into the commodity bucket, the commodity is adapted to fall into the commodity bucket, and therefore, commodities in which, for example, pudding, yogurt or the like are contained in a container, have had a problem that the quality of the commodities is impaired because the contents are damaged due to falling down or falling shock caused by a change in posture during falling.

SUMMARY OF THE INVENTION

The present invention has been achieved in the light of the above-described problem, and is aimed to provide an automatic vending machine capable of preventing, when the commodity is being carried out from the commodity column to the commodity receptor, the commodity from falling down due to a change in posture of the commodity, and mitigating falling shock of the commodity.

According to the present invention, there is provided an automatic vending machine provided with: a vending machine body having a commodity outlet port at a predetermined position; a plurality of commodity columns arranged at least in one direction of the widthwise direction and the up-and-down direction of the vending machine body; a commodity carrying-out mechanism provided for each commodity column respectively, for carrying out a commodity within the commodity column in a predetermined direction; a commodity receptor capable of receiving a commodity to be carried out of each commodity column; and a moving mechanism for moving the commodity receptor in a direction of arrangement of each commodity column, wherein the commodity receptor is moved to any commodity column by means of the moving mechanism, the commodity within the commodity column is carried out into the commodity receptor by means of the commodity carrying-out mechanism, the commodity receptor, which has received the commodity, is moved to the commodity outlet port by means of the moving mechanism, further comprising: a commodity supporting member provided for the commodity receptor so as to be movable from one end side thereof toward the other end side; and a driving mechanism, which positions the commodity supporting member on one end side of the commodity receptor to cause a commodity to be carried out of the commodity column to abut on the commodity supporting member, and moves the commodity supporting member toward the other end side of the commodity receptor with the commodity supporting member abutted on the commodity.

Thereby, when the commodity is carried out to the commodity receptor from the commodity column, the commodity abuts on the commodity supporting member located on one end side of the commodity receptor, and the commodity supporting member is moved toward the other end side of the commodity receptor with the commodity abutted thereon by means of the driving mechanism, and therefore, the commodity is received within the commodity receptor while the commodity is being supported by the commodity supporting member. Therefore, it is possible to reliably prevent the contents of the commodity to be carried out of the commodity column from being damaged due to falling down or falling shock of the commodity, and this is very advantageous when commodities in which, for example, pudding, yogurt or the like are contained in a container, are sold.

Also, according to the present invention, in the above-described structure, the commodity receptor is provided with a descendingly inclined commodity guide member, which slidingly moves the commodity for moving toward the other end side of the commodity receptor while abutting on the commodity supporting member, up to a predetermined position within the commodity receptor.

Thereby, when the commodity is being received by the commodity receptor, the commodity slidingly moves on the descendingly-inclined commodity guide member while abutting on the commodity supporting plate, and therefore, the commodity can be smoothly guided up to a predetermined position within the commodity receptor, thus making it possible to more reliably prevent vibration or shock onto the commodity from occurring.

Also, according to the present invention, in the structure, at least an abutted portion of the commodity supporting member on the commodity is formed to face obliquely upward toward one end side of the commodity receptor.

Thereby, since the commodity to be carried out of the commodity column can be reliably supported by the commodity guide member, the commodity can be always maintained in a stable posture even during a movement of the commodity guide member.

Also, according to the present invention, in the above-described structure, there are provided a gear provided for each of the commodity columns for driving the commodity carrying-out mechanism for the commodity column; and a column driving mechanism provided for the commodity receptor, for carrying out the commodity within the commodity column into the commodity receptor by means of the commodity carrying-out mechanism by transmitting a rotating force to the gear of the commodity column, and the column driving mechanism is constructed by: a first gear capable of meshing with a commodity column-side gear; a second gear provided on the commodity receptor side for rotation, for meshing with the first gear; a gear supporting member for supporting the first gear on one end side for rotation with the other end side supported for rotation around the rotating shaft of the second gear; a motor capable of rotating in both forward and reverse directions for rotating the second gear; and pressure-contact means for bringing the second gear and the gear supporting member into press contact with each other so as to rotate integrally. Thus, the motor is rotated in a predetermined direction, whereby the first gear is moved on the commodity column side by means of the rotation of the gear supporting member to mesh with the commodity column-side gear, and the second gear is rotated against the pressure-contact means while the rotation of the gear supporting member is regulated at a position of the engagement with the commodity column-side gear, while the rotation of the motor is reversed, whereby the first gear is adapted to be moved up to a predetermined position on the commodity receptor side by means of the rotation of the gear supporting member.

Thereby, when the commodity receptor moves to any commodity column, the motor of the column driving mechanism rotates in a predetermined direction, whereby the first gear rotates integrally with the gear supporting member by the pressure-contact means to move on the commodity column side for meshing with the commodity column-side gear. At this time, the rotation of the gear supporting member is regulated at a position of the engagement with the commodity column-side gear, and the second gear rotates against the pressure-contact means, and therefore, the rotating force of the second gear is transmitted to the commodity column-side gear through the first gear to drive the commodity carrying-out mechanism of the commodity column. Also, when the commodity receptor moves to another position, the rotation of the motor of the column driving mechanism is reversed, whereby the first gear rotates integrally with the gear supporting member by the pressure-contact means to move up to a predetermined position on the commodity receptor side. Therefore, since driving of the commodity carrying-out mechanism for each commodity column and movement of the gear toward the commodity column side and the commodity receptor side can be performed by one motor, the structure of the commodity receptor side can be simplified, and it is possible to make the commodity receptor small-sized, light-weighted, and lower in cost.

Also, according to the present invention, in the structure, part of the gear supporting member is formed so as to extend from one side of the second gear to the other side, and between one side of the second gear and a predetermined portion of the gear supporting member, a spring, which forms the pressure-contact means, is interposed in a compressed state.

Thereby, the other side of the second gear is pressed into contact with the gear supporting member side by means of the spring and its frictional force causes the second gear and the gear supporting member to rotate integrally, and therefore, it is possible to integrally rotate the second gear and the gear supporting member in a simple structure, and moreover, the reliable operation can be achieved.

Also, according to the present invention, in the structure, the commodity carrying-out mechanism for each commodity column is constructed by: an endless-shaped belt, on the upper surface of which the commodity is placed; and a pair of pulleys for rotationally supporting the belt and rotating by means of a commodity column-side gear.

Thereby, the rotation of the gear rotates the belt, whereby the commodity of the commodity column moves together with the upper surface of the belt to be carried out, and since, for example, the commodities are pressed from behind and are not brought into contact with each other, this is very advantageous when deformation-prone commodities or fall-prone commodities are sold.

DESCRIPTION OF THE PREFERRED EMBODIMENTS

Figure 1:
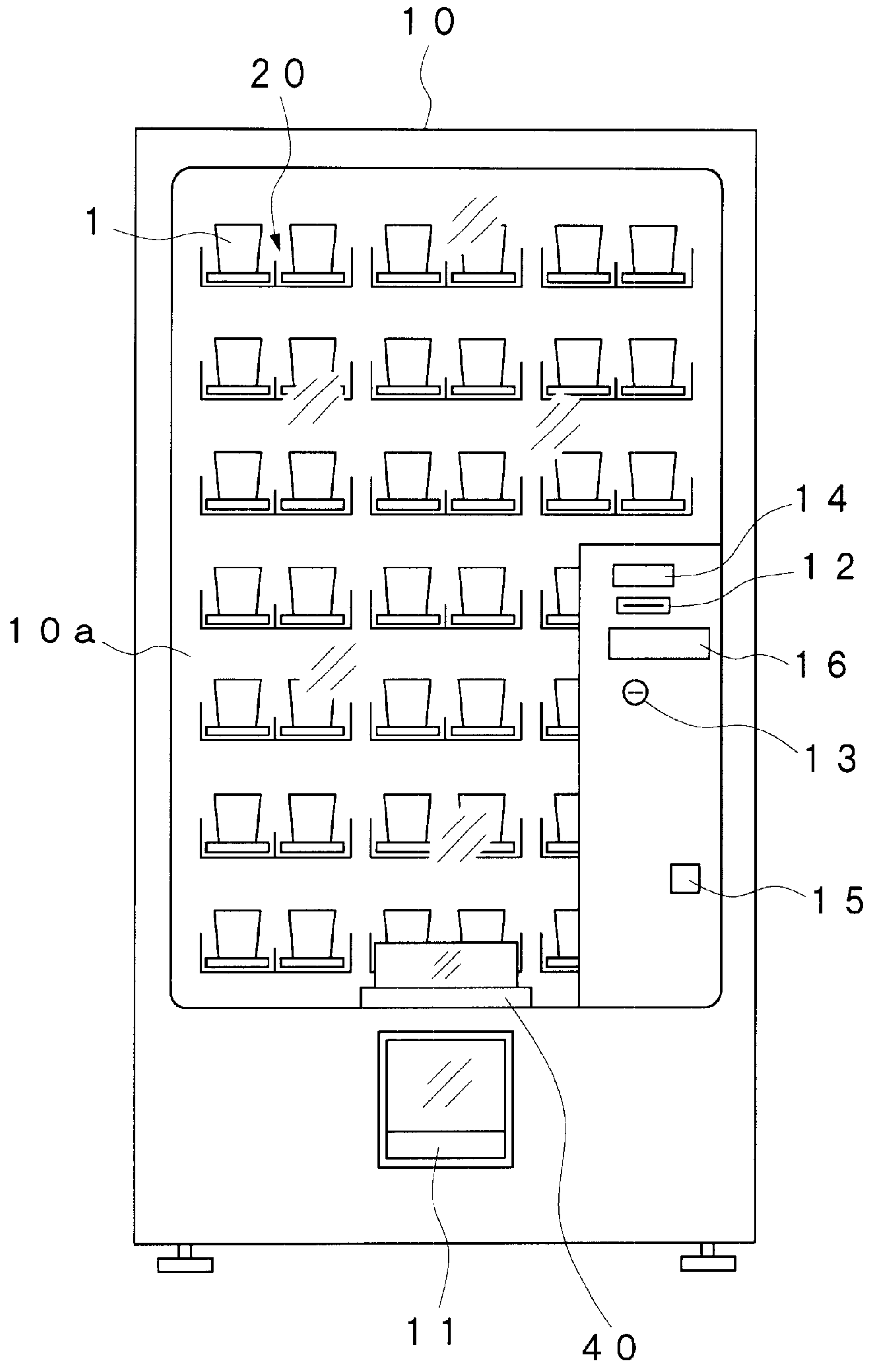
FIG. 1 is a front view showing an automatic vending machine according to an embodiment of the present invention.
Figure 2:
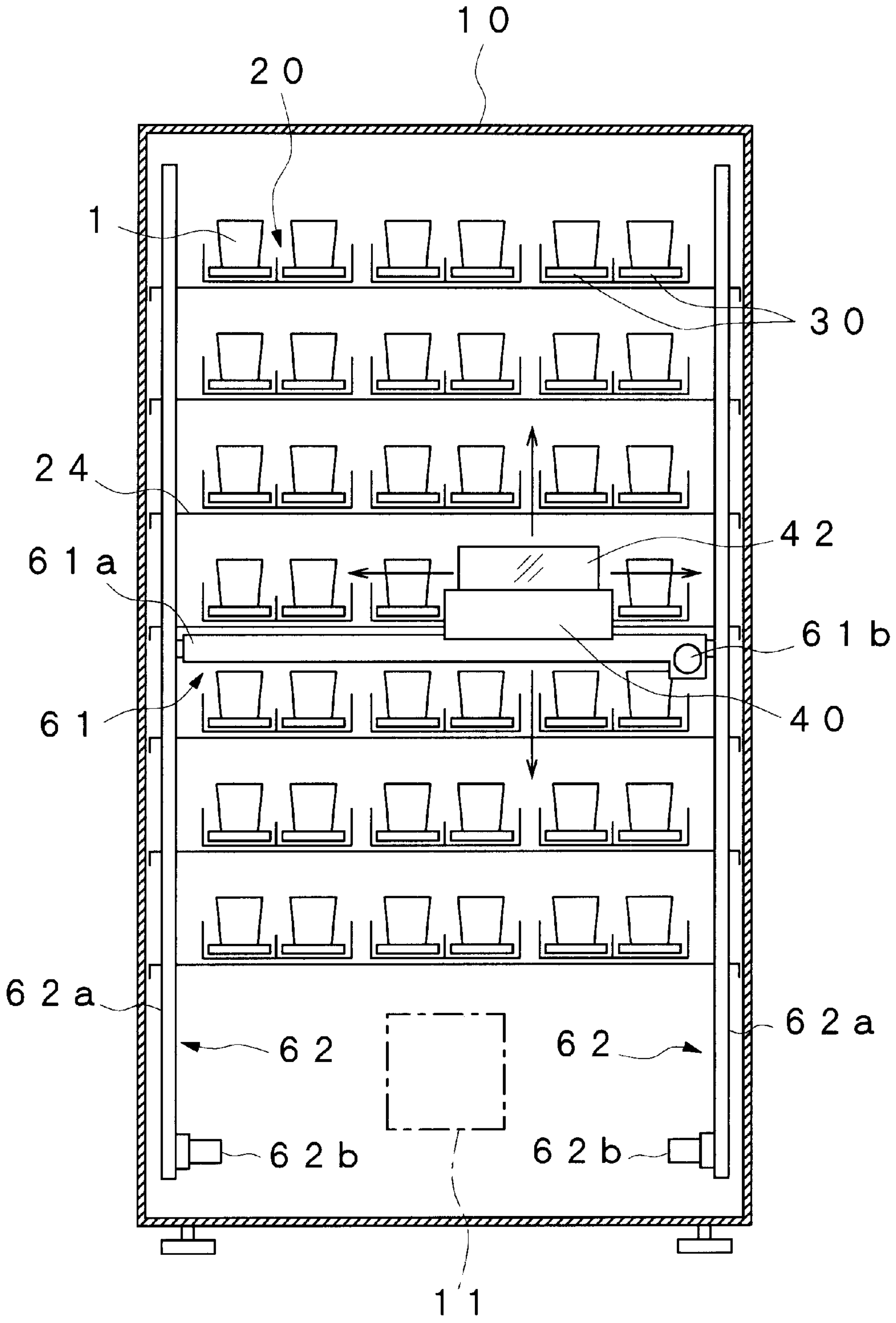
FIG. 2 is a front sectional view showing the automatic vending machine.
Figure 3:
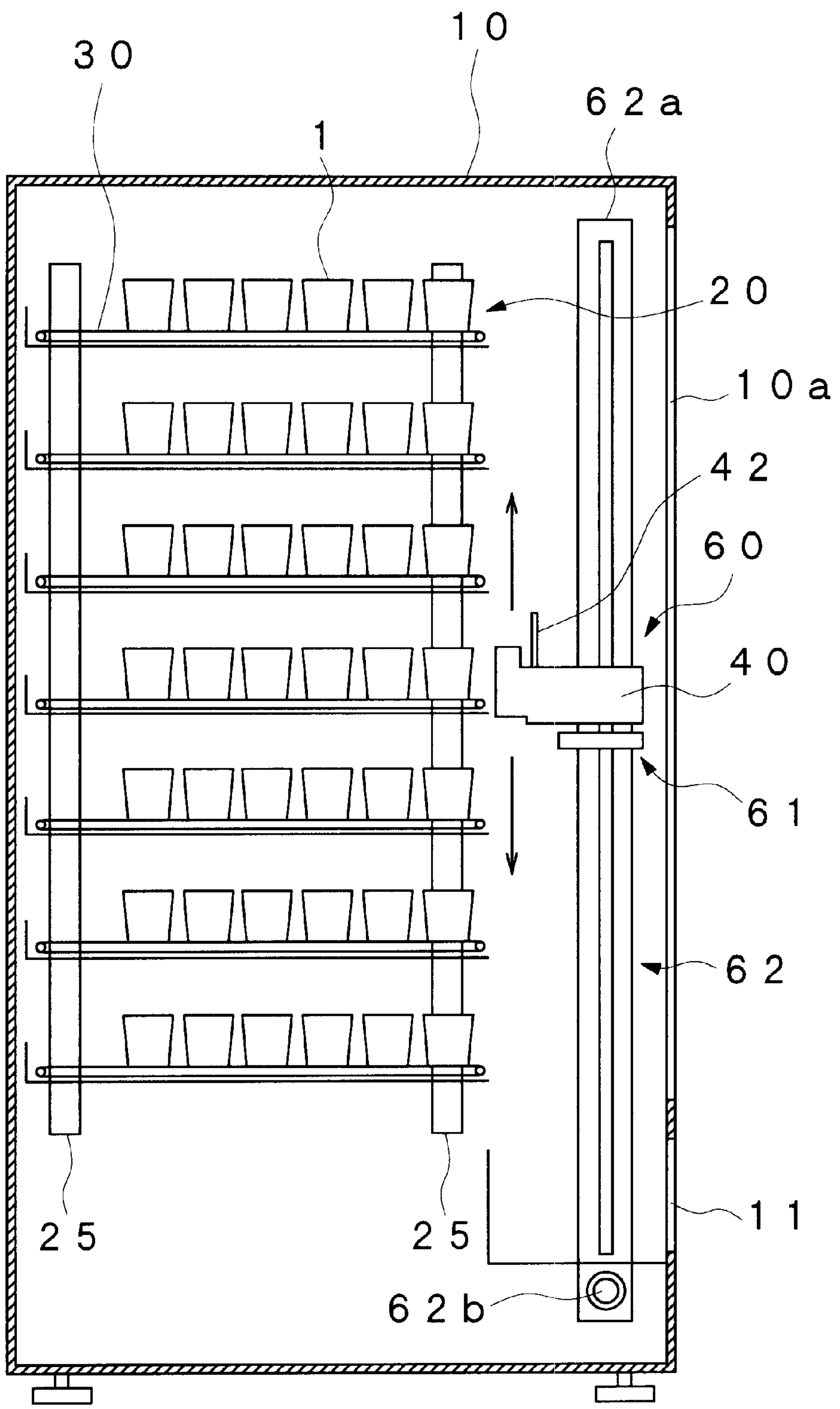
FIG. 3 is a side sectional view showing the vending machine.
Figure 4:
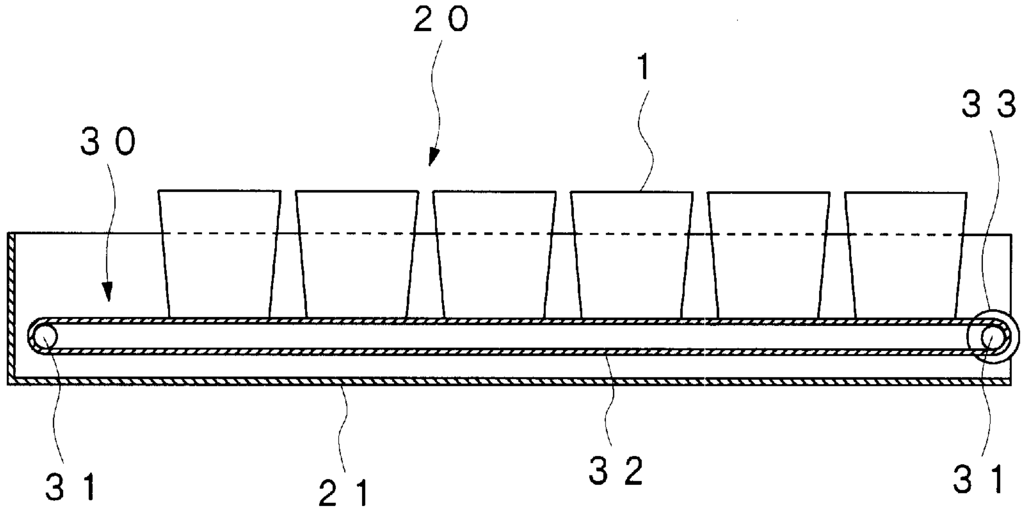
FIG. 4 is a side sectional view showing a commodity column.
Figure 5:
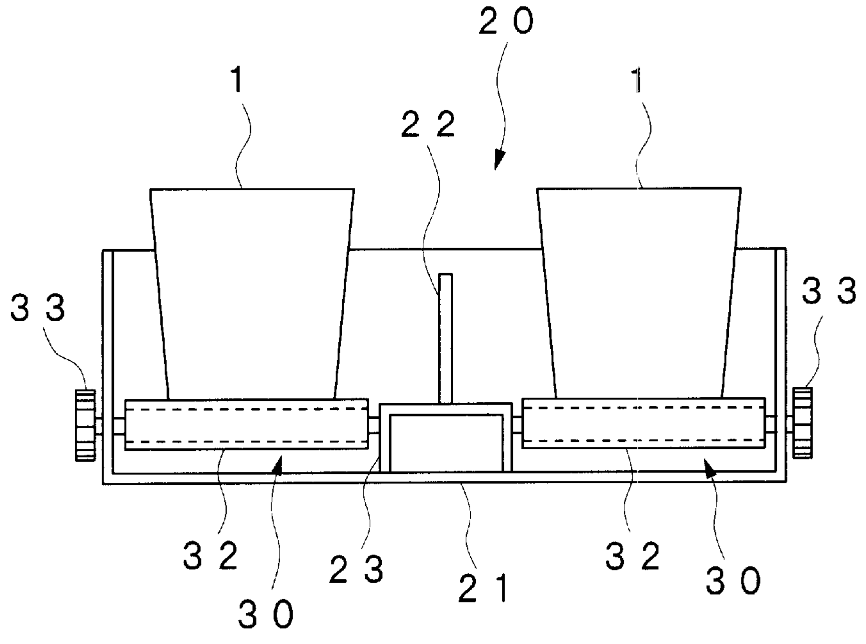
FIG. 5 is a front view showing the commodity column.
Figure 6:
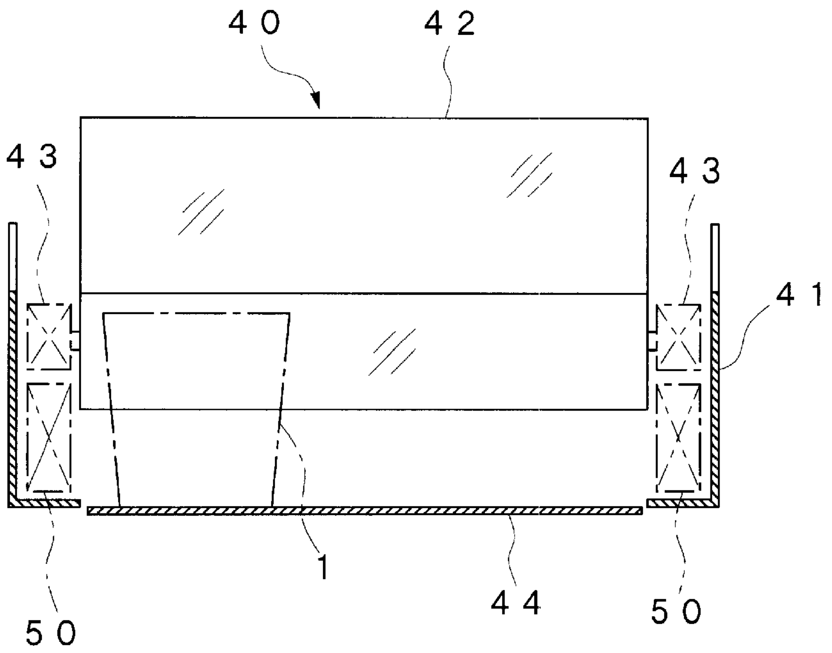
FIG. 6 is a front sectional view showing a commodity bucket.
Figure 7:
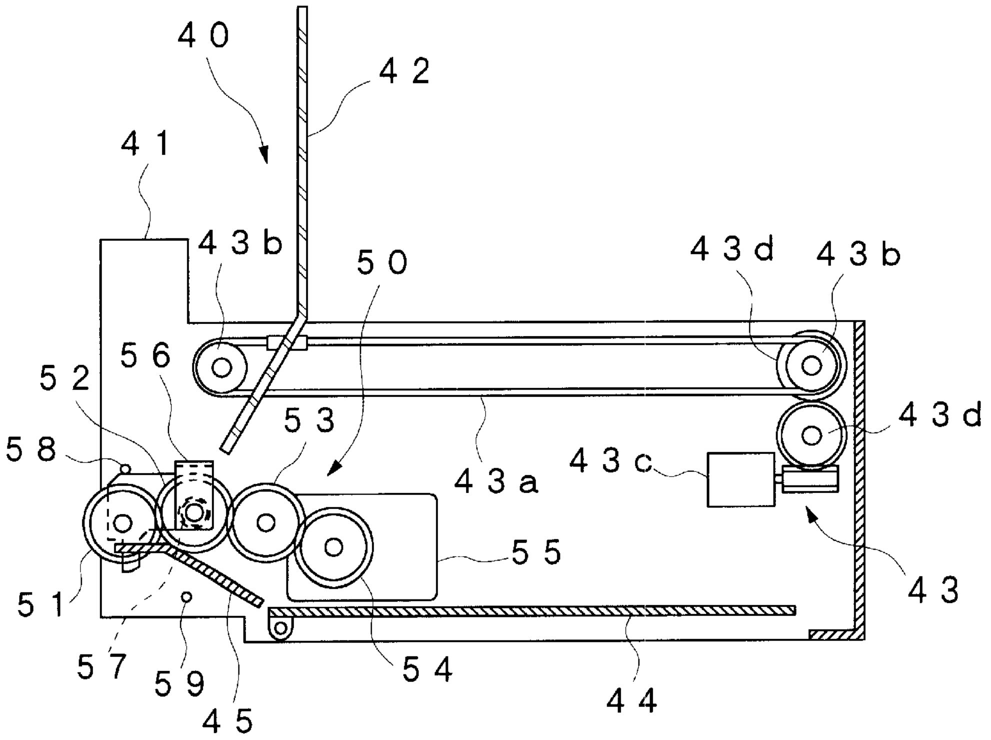
FIG. 7 is a side sectional view showing the commodity bucket.
Figure 8:
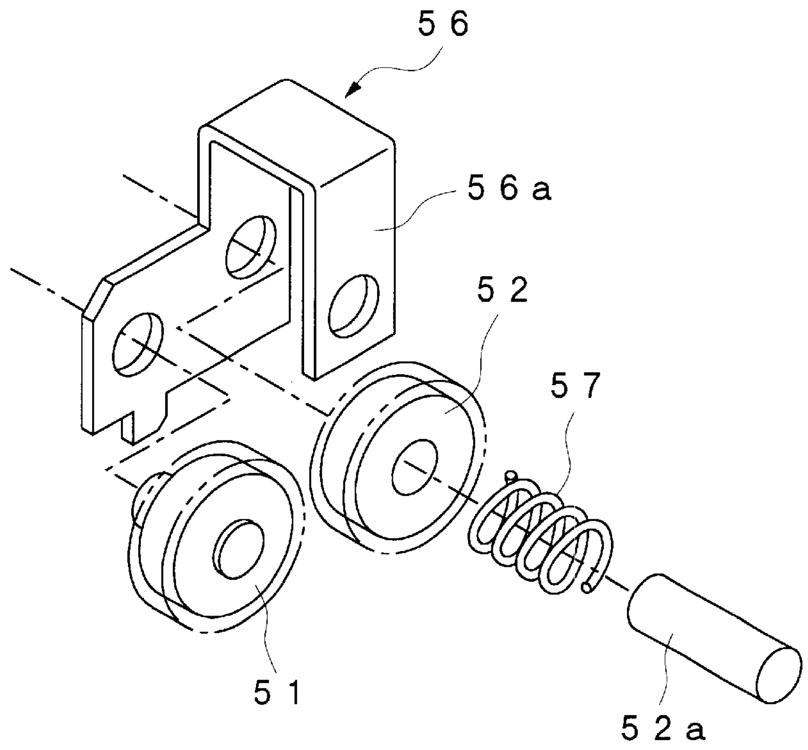
FIG. 8 is an essential exploded perspective view showing a column driving mechanism.

FIGS. 1 to 13 show an embodiment according to the present invention.

An automatic vending machine according to the present embodiment is constructed of: a vending machine body 10, a front surface of which is partially formed transparently; a plurality of commodity columns 20 arranged in a widthwise direction and in an up-and-down direction of the vending machine body 10; a commodity carrying-out mechanism 30 provided for each commodity column 20 respectively; a commodity bucket 40 as a commodity receptor capable of receiving a commodity A to be carried out from each commodity column 20; a column driving mechanism 50 provided on the commodity bucket 40 side, for driving the commodity carrying-out mechanism 30 for each commodity column 20; and a bucket moving mechanism 60 for moving the commodity bucket 40 in a direction of arrangement of each commodity column 20.

In the vending machine body 10, a portion of the front surface except for the lower part is opened, and this opening is covered with a transparent glass plate 10*a*. In the lower part of the front surface of the vending machine body 10, there is provided a commodity output port 11, and on one side of the front surface, there are provided: a bill insertion slot 12; a coin insertion slot 13; an amount display 14; a coin return port 15 and a commodity selective operating unit 16. In this respect, the interior of the vending machine body 10 may be cooled or heated to predetermined temperature in accordance with the type of the commodity to be sold, or may remain at normal temperature.

Each commodity column 20 has a column body 21 extending in a back-and-forth direction, and is provided for the vending machine body 10 to enable the commodity column 20 to be drawn out forward. In this respect, as regards drawing-out structure of the commodity column 20, detailed description is omitted, and it can be constructed by using, for example, a well-known slide rail or the like. The commodity column 20 has a partition plate 22 for partitioning the interior of a column body 21 in a widthwise direction, and the partition plate 22 is mounted onto a base 23 provided at the center of the column body 21 in the widthwise direction. Also, each commodity column 20 is supported by a shelf 24 for extending in a widthwise direction respectively for each stage in the up-and-down direction, and each shelf 24 is fixed at predetermined positions in the up-and-down direction by a plurality of struts 25 vertically installed on both sides in the widthwise direction within the vending machine body 10.

Each commodity column 20 is provided with two each of commodity carrying-out mechanisms 30 respectively, and each commodity carrying-out mechanism 30 of the commodity column 20 is arranged in the widthwise direction to each other within the column body 21. Each commodity carrying-out mechanism 30 consists of a pair of pulleys 31 freely rotationally mounted to a front end side and a rear end side of the column body 21 respectively; an endless-shaped belt 32 supported by each pulley 31; and a gear 33 mounted to a rotating shaft of the pulley 31 on the front end side in such a manner as to place a commodity 1 on the upper surface of the belt 32. In other words, each commodity column 20 is constructed such that two lines each of the commodities 1 are contained with a partition plate 22 interposed therebetween respectively. Also, in the commodity carrying-out mechanism 30, the gear 33 of the pulley 31 is rotated through the use of a column driving mechanism 50 to be described later, whereby the belt 32 is rotated to move the commodity 1 forward.

The commodity bucket 40 has a bucket body 41 formed in a box shape, and the bucket body 41 is formed to have substantially equal width to the commodity column 20. The commodity bucket 40 has a commodity supporting plate 42 for supporting the commodity 1 when receiving it from the commodity column 20, and the commodity supporting plate 42 is adapted to move in a front-and-back direction of the bucket body 41 by means of a supporting plate moving mechanisms 43 provided on both sides of the bucket body 41 in the width-wise direction respectively. The commodity supporting plate 42 is formed by a transparent plate extending in the up-and-down direction, and its lower end side is bent to face obliquely upward toward one end side (commodity column 20 side) of the commodity bucket 40. Each supporting plate moving mechanism 43 consists of: endless-shaped wire 43*a* coupled to the commodity supporting plate 42; a pair of front and rear pulleys 43*b* for rotationally supporting the wire 43*a*; and a motor 43*c* for rotating the front pulley 43*b*, and the motor 43*c* is adapted to transmit a rotating force to the pulley 43*b* through a plurality of gears 43*d*. Also, on the bottom surf ace side of the bucket body 41, there is provided a bottom plate 44, the rear end of which is rotationally supported in such a manner that the bottom plate 44 opens or closes the bottom surface of the bucket body 41 by means of a driving mechanism (not shown). Further, in the rear part of the bucket body 41, there is provided a descendingly-inclined commodity guide plate 45 toward the bottom plate 44.

Figure 9:
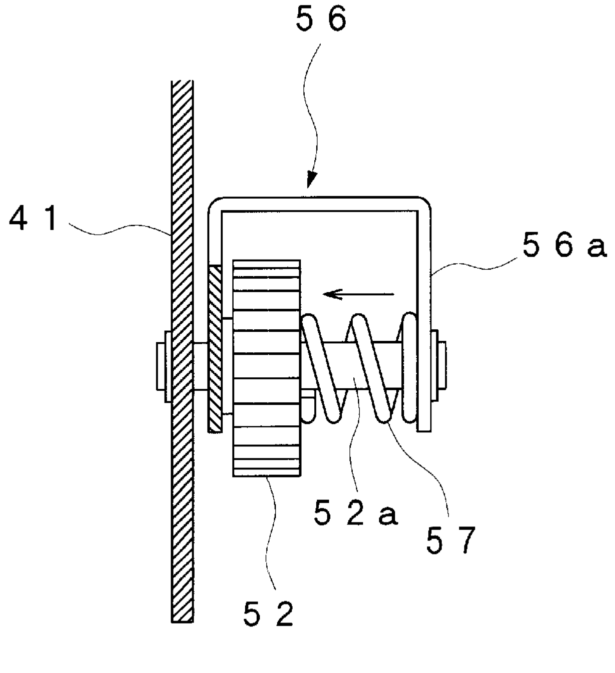
FIG. 9 is an essential front sectional view showing the column driving mechanism.

The column driving mechanism 50 consists of: a first gear 51 capable of meshing with a gear 33 on the side of the commodity column 20; a second gear 52 for meshing with the first gear 51; a third gear 53 for meshing with the second gear 52; a fourth gear 54 for meshing with the third gear 53; and a motor 55 capable of rotating in both forward and reverse directions for rotating the fourth gear 54, and they are provided on both sides in the widthwise direction within the commodity bucket 40 respectively. The second and third gears 52 and 53 are rotationally mounted to the bucket body 41, and the fourth gear 54 is coupled to a rotating shaft of the motor 55. To a shaft 52*a*, which forms a rotating shaft of the second gear 52, a freely-rotatable lever 56 is mounted as a gear supporting member, and on one end side of the lever 56, the first gear 51 is rotationally mounted. In other words, the first gear 51 is adapted to be capable of rotating together with the lever 56 around the rotating shaft of the second gear 52. On the other end side of the lever 56, there is provided a bent portion 56*a* extending in an L-character shape in a widthwise direction of the second gear 52, and as shown in FIG. 9, the second gear 52 is arranged between the lever 56 body side and the bent portion 56*a*. In this case, the shaft 52*a* is at its both end sides supported by the body side of the lever 56 and the bent portion 56*a* respectively, and between one side of the second gear 52 and the bent portion 56*a*, there is interposed a coil-shaped spring 57 as pressure-contact means wound on the shaft 52*a* in a compressed state. More specifically, the other side of the second gear 52 is pressed against the body side of the lever 56 by the spring 57, and a frictional force caused by this pressure contact is adapted to cause the lever 56 to integrally rotate with the second gear 52. Also, at an upper predetermined position and at a lower predetermined position of the lever 56, there are provided a first stopper 58 and a second stopper 59 respectively, and when it rotates up to the upper predetermined position (position of engagement with the gear 33 on the commodity column 20 side), the lever 56 abuts upon the first stopper 58, and when it rotates up to the lower predetermined position (standby position), the lever 56 is adapted to abut on the second stopper 59. At this time, when the lever 56 abuts on either stopper 58 or stopper 59, the abutment rotates the second gear 52 against a frictional force with the lever 56 caused by the spring 57 while the rotation of the lever 56 is being regulated.

The bucket moving mechanism 60 consists of: a first driving unit 61 for moving the commodity bucket 40 in a widthwise direction; and a pair of second driving units 62 for moving the first driving unit 61 in an up-and-down direction, and each of the second driving units 62 is arranged on both sides in a widthwise direction within the vending machine body 10 respectively. The first driving unit 61 consists of: a guide rail 61*a* for movably supporting the commodity bucket 40; and a motor 61*b* for moving the commodity bucket 40. The second driving unit 62 consists of: a guide rail 62*a* for movably supporting the first driving unit 61; and a motor 62*b* for moving the first driving unit 61. In this bucket moving mechanism 60, positions of each commodity column 20 in the widthwise direction and in the up-and-down direction are detected by position detecting means such as an optical sensor, whereby the commodity bucket 40 is adapted to be moved to any commodity column 20 or the commodity outlet port 11 by each driving unit 61, 62.

Figure 10A:
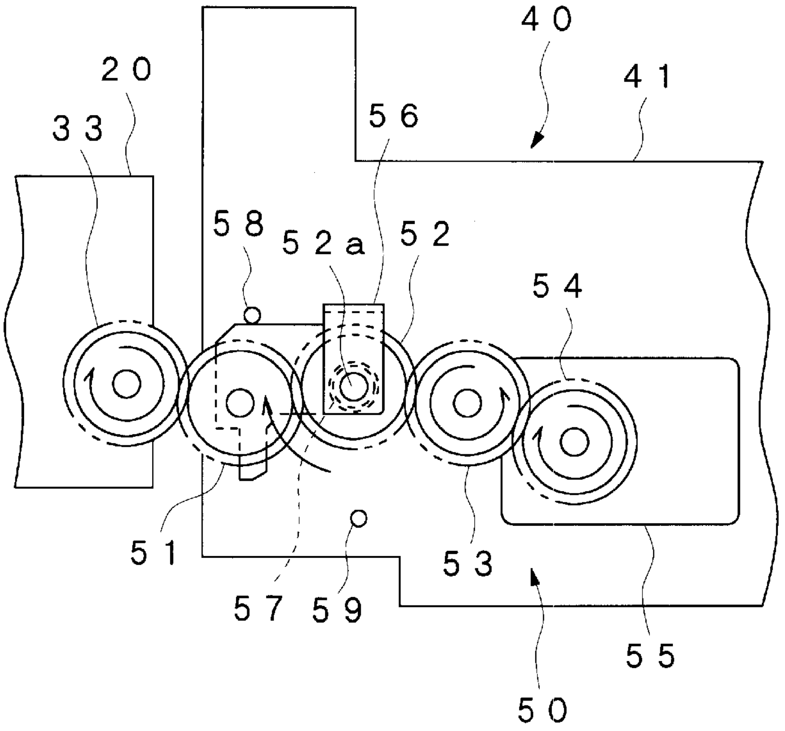
FIG. 10 is an explanatory view illustrating an operation of the column driving mechanism.
Figure 10B:
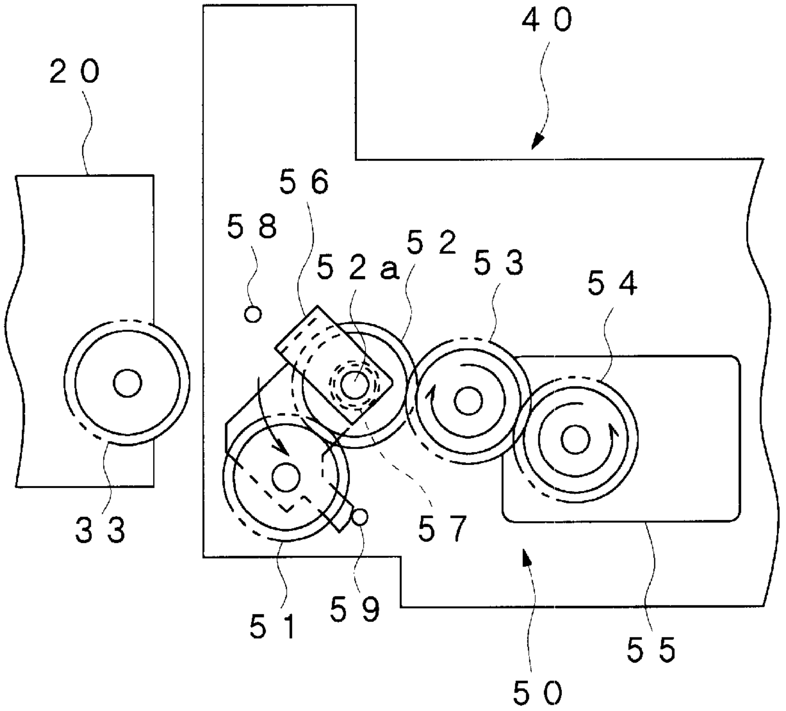
Figure 11A:
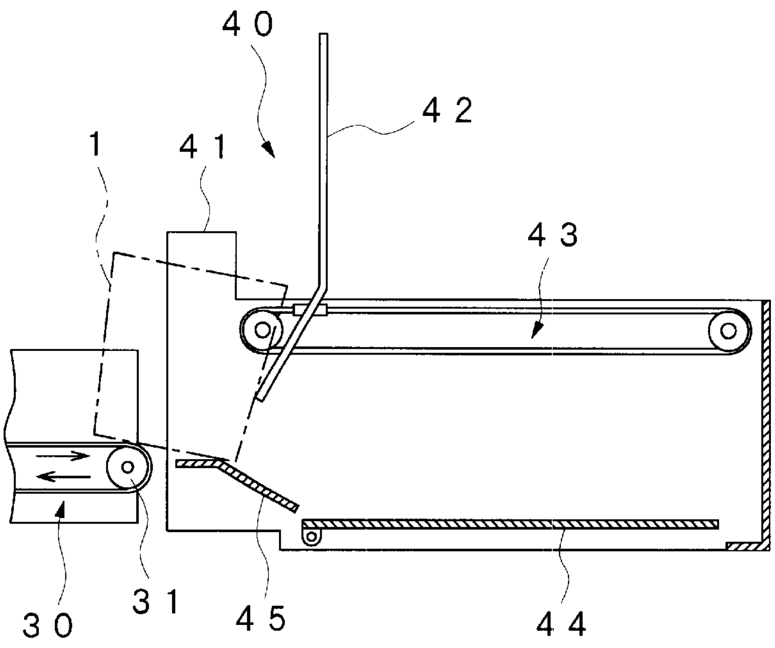
FIG. 11 is an explanatory view illustrating an operation of a commodity supporting plate.
Figure 11B:
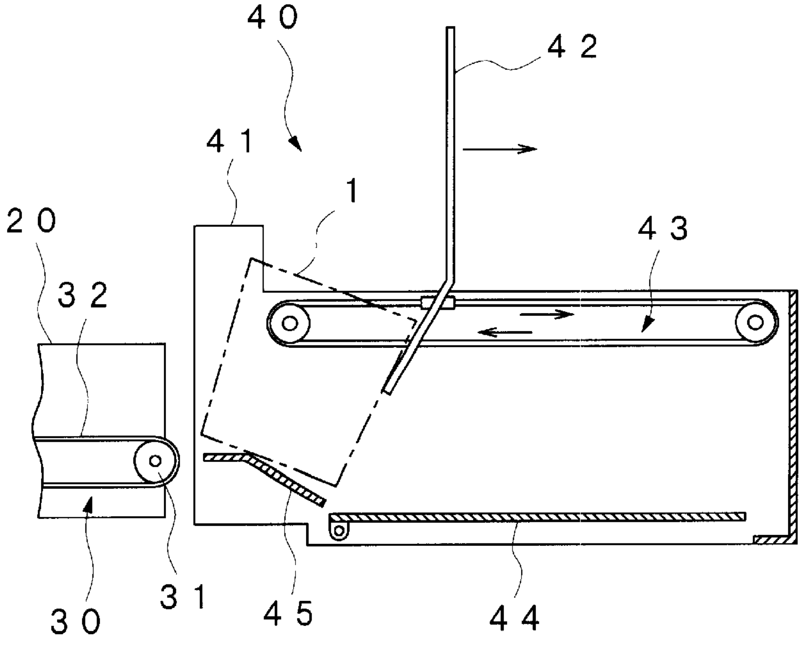
Figure 12A:
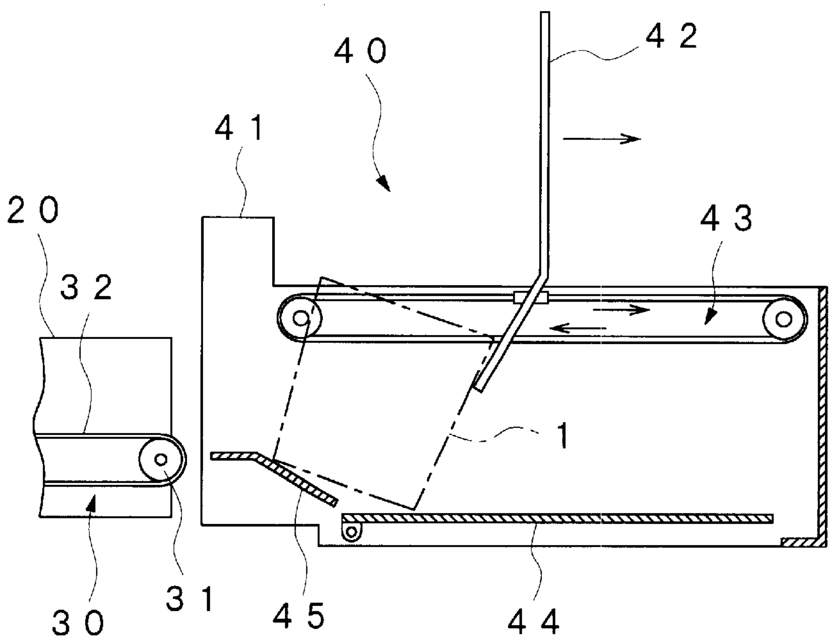
FIG. 12 is an explanatory view illustrating an operation of the commodity supporting plate.
Figure 12B:
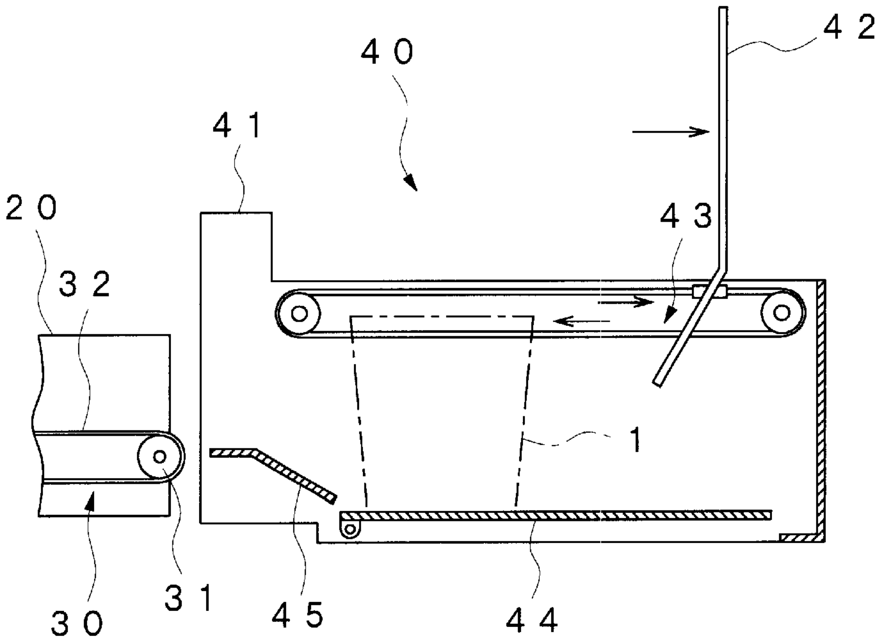
Figure 13:
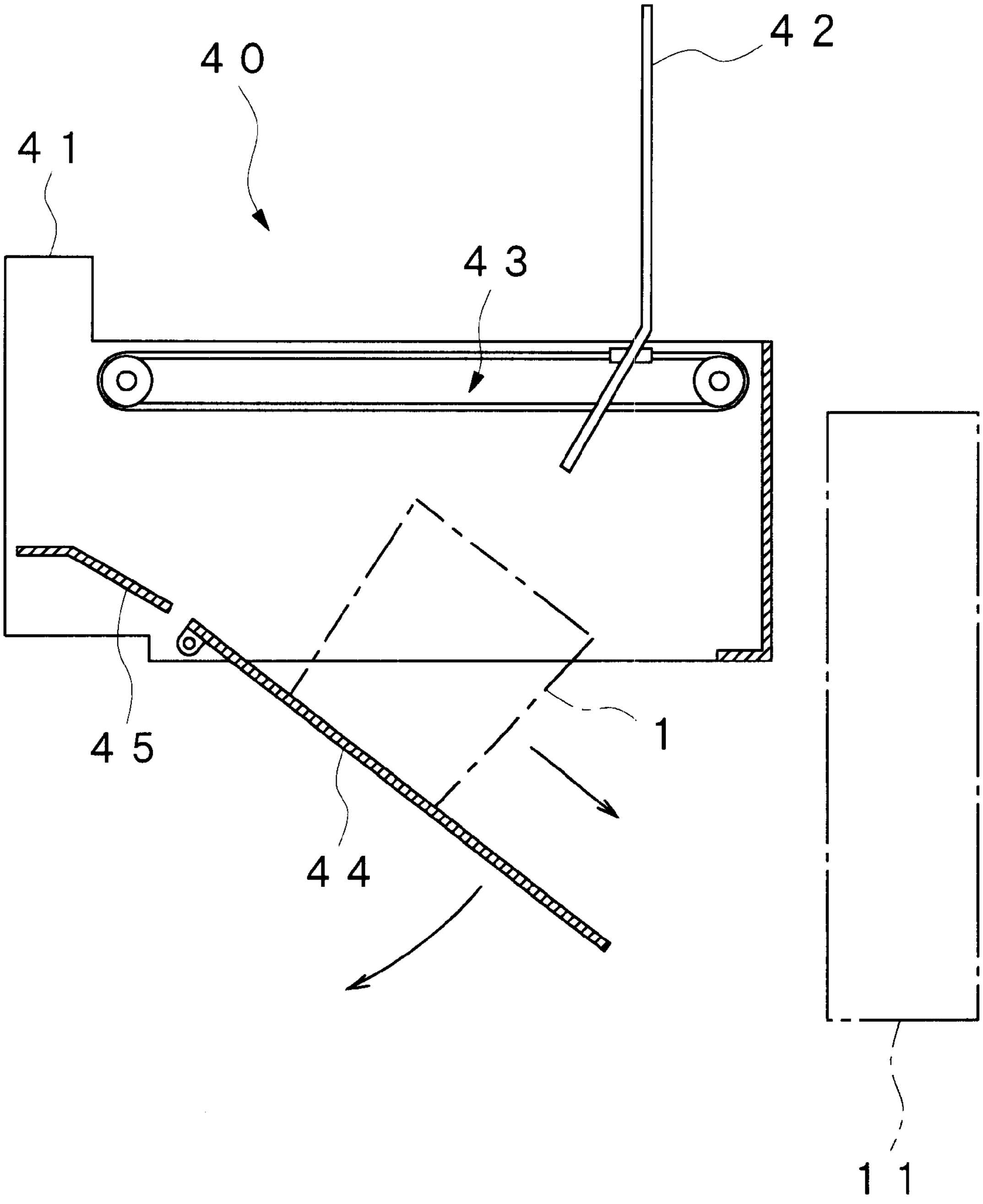
FIG. 13 is an explanatory view illustrating an operation of the commodity supporting plate.

In an automatic vending machine constructed as described above, when money is inserted and a commodity is selected, the commodity bucket 40 is moved to a commodity column 20 corresponding to the selected commodity by the bucket moving mechanism 60, and a motor 55 of the column driving mechanism 50 is rotated in a predetermined direction. In this case, since the commodity column 20 contains commodities 1 placed in two lines in the widthwise direction, only the column driving mechanism 50 corresponding to a line, in which the selected commodity is contained, operates. Thereby, as shown in FIG. 10A, the lever 56 of the column driving mechanism 50 rotates upward so that the first gear 51 meshes with the gear 33 on the commodity column 20 side. At this time, the lever 56 stops the rotation by the abutment on the first stopper 58, but each gear 51, 52, 53 and 54 continues to rotate against the frictional force caused by the spring 57 as described above, and therefore, the rotating force of the motor 55 is transmitted to the gear 33 on the commodity column 20 side. Thereby, the belt 32 of the commodity carrying-out mechanism 30 is rotated to carry out the commodity 1 on the belt 32 into the commodity bucket 40. At this time, when the commodity 1 enters the bucket body 41, the commodity 1 abuts on the lower end side of the commodity supporting plate 42 while the commodity 1 is inclining toward the bucket body 41 side on the commodity guide plate 45 as shown in FIG. 11A. When the entry of this commodity 1 is detected by a sensor (not shown), the commodity supporting plate 42 starts to move toward the front of the bucket body 41 at low speed as shown in FIG. 11B. Thereby, the commodity 1 transfers onto the commodity guide plate 45 and at the same time, the commodity 1 slides down on the inclined surface of the commodity guide plate 45 as shown in FIG. 12A while being supported by the commodity supporting plate 42, and moves onto the bottom plate 44 as shown in FIG. 12B. Thereafter, the motor 55 of the column driving mechanism 50 reverses the rotation, whereby the lever 56 rotates downward as shown in FIG. 10B to release the engagement between the first gear 51 and the gear 33 on the commodity column 20 side. Thus, when the commodity bucket 40 containing the commodity 1 moves to the commodity outlet port 11 by means of the bucket moving mechanism 20, the bottom plate 44 of the commodity bucket 40 is opened so that the commodity 1 within the commodity bucket 40 is carried out on the commodity outlet port 11 side while it slidingly moves on the bottom plate 44 as shown in FIG. 13.

As described above, according to the automatic vending machine of the present embodiment, when the commodity 1 is carried out onto the commodity bucket 40 from the commodity column 20, the commodity supporting plate 42 located on the rear end side of the commodity bucket 40 is caused to abut on the commodity 1, and the commodity supporting plate 42 is moved toward the front end side of the commodity bucket 40 with the commodity 1 abutted thereon, whereby the commodity 1 is caused to be received within the commodity bucket 40 while the commodity 1 is being supported by the commodity supporting plate 42. Therefore, it is possible to reliably prevent the content from being damaged due to falling down or falling shock caused by a change in posture of the commodity 1 during carrying-out, and this is very advantageous when commodities in which, for example, pudding, yogurt or the like are contained in a container, are sold.

Also, since when the commodity 1 is received in the commodity bucket 40, the commodity 1 has been caused to slidingly move on the descendingly-inclined commodity guide plate 45 while being supported by the commodity supporting plate 42, it is possible to smoothly guide the commodity 1 onto the bottom plate 44 within the commodity bucket 40, and to further reliably prevent vibration or shock onto the commodity 1 from occurring.

Further, since the lower end side of the commodity guide plate 45 has been formed to face obliquely upward toward one of the commodity bucket 40, it is possible to reliably support the commodity 1 to be carried out of the commodity column 20 by the commodity guide plate 45, and to always hold the commodity 1 in a stable posture even when it is moving on the commodity guide plate 45.

Also, according to the automatic vending machine of the present embodiment, when the lever 56 supporting the first gear 51 on one side thereof is caused to integrally rotate with the second gear 52 by means of the frictional force of the spring 57 and the first gear 51 meshes with the gear 33 on the commodity column 20 side by the rotation of the lever 56, the second gear 52 is caused to rotate against the frictional force of the spring 57 while the rotation of the lever 56 is being regulated, and the rotating force of the second gear 52 side is caused to transmit to the gear 33 on the commodity column 20 side through the first gear 51. Therefore, the motor 55 is rotated in a predetermined direction to thereby enable the first gear 51 to move to the commodity column 20 side and the rotational force to be transmitted, and the rotation of the motor 55 is reversed to thereby enable the first gear 51 to move toward the commodity bucket 40 side. Accordingly, since these operations can be attained by one motor 55, the structure of the commodity bucket 40 side can be simplified, and it is possible to make the commodity bucket 40 small-sized, light-weighted, and lower in cost.

Further, the second gear 52 is brought into press contact with the lever 56 side by means of the spring 57, whereby the second gear 52 and the lever 56 are caused to integrally rotate each other. Therefore, a reliable operation can be achieved in a simple structure.

In addition, since the commodity carrying-out mechanism 30 of each commodity column 20 is constructed by means of the belt 32 to be rotated by the gear 33 and the commodity 1 of the commodity column 20 is caused to be moved together with the upper surface of the belt 32 to be carried out, the commodities are not pressed from behind by a pressing member to be brought into contact with each other unlike the conventional case, but this is very advantageous when deformation prone commodities or fall-prone commodities are sold.

In this respect, in the above-described embodiment, there have been provided the first and second stoppers 58 and 59 for stopping the rotation of the lever 56 at the upper and lower predetermined positions respectively, but if the upward rotation of the lever 56 is caused to be stopped by abutment between the first gear 51 and the gear 33 on the commodity column 20 side, the first stopper 58 will be able to be omitted. Also, if the motor 55 is caused to be stopped after the lever 56 is rotated downward by a predetermined angle, the second stopper 59 will be also able to be omitted.

What is claimed is:

1. An automatic vending machine, comprising:

a vending machine body having a commodity outlet port at a predetermined position;

a plurality of commodity columns arranged at least in one direction of a widthwise direction and an up-and-down direction of said vending machine body;

a commodity carrying-out mechanism provided for each commodity column respectively, for carrying out a commodity within said commodity column in a predetermined direction;

a commodity receptor capable of receiving a commodity to be carried out of each commodity column; and a moving mechanism for moving said commodity receptor in a direction of arrangement of each commodity column, wherein said commodity receptor is moved to any commodity column by means of said moving mechanism, said commodity wit said commodity column is carried out into said commodity receptor by means of said commodity carrying-out mechanism, and said commodity receptor, which has received said commodity, is moved to said commodity outlet port by means of said moving mechanism, further comprising:

a commodity supporting member provided for said commodity receptor so as to be movable from one end side thereof toward the other end side in said predetermined direction; and a driving mechanism, which positions said commodity supporting member on the one end side of said commodity receptor to cause a commodity to be carried out of said commodity column to abut on said commodity supporting member, and moves said commodity supporting member toward the other end side of said commodity receptor wish said commodity supporting member abutted on said commodity.

2. The automatic vending machine according to claim 1, wherein said commodity receptor is provided with a descendingly-inclined commodity guide member, which slidingly moves a commodity for moving toward the other end side of said commodity receptor while abutting on said commodity supporting member, up to a predetermined position within said commodity receptor.

3. The automatic vending machine according to claim 2, wherein at least an abutted portion of said commodity supporting member on said commodity is formed to face obliquely upward toward one end side of said commodity receptor.

4. The automatic vending machine according to claim 3, comprising:

a gear provided for each of said commodity columns for driving said commodity carrying-out mechanism for said commodity column; and a column driving mechanism provided for said commodity receptor, for carrying out said commodity within said commodity column into said commodity receptor by means of said commodity carrying-out mechanism by transmitting a rotating force to the gear of said commodity column, wherein said column driving mechanism is constructed by:

a first gear capable of meshing with a commodity column-side gear, a second gear provided on said commodity receptor side for rotation, for meshing with said first gear, a gear supporting member for supporting said first gear on one end side for rotation with the other end side supported for rotation around the rotating shaft of said second gear;

a motor capable of rotating in both forward and reverse directions for rotating said second gear, and pressure-contact means for bringing said second gear and said gear supporting member into press contact with each other so as to rotate integrally, and said motor is rotated in a predetermined direction, whereby said first gear is moved on said commodity column side by means of the rotation of said gear supporting member to mesh with said commodity column-side gear, and said second gear is rotated against pressure contact means while the rotation of said gear supporting member is regulated at a position of the engagement with said commodity column-side gear, while the rotation of said motor is reversed, whereby said first gear is adapted to be moved up to a predetermined position on said commodity receptor side by means of the rotation of said gear supporting member.

5. The automatic vending machine according to claim 4, wherein part of said gear supporting member is formed so as to extend from one side of said second gear to the other side, and between one side of said second gear and a predetermined portion of said gear supporting member, a spring, which forms said pressure-contact means, is interposed in a compressed state.

6. The automatic vending machine according to claim 4, wherein said commodity carrying-out mechanism for each of said commodity columns is constructed by:

an endless-shaped belt, on the upper surface of which said commodity is placed; and a pair of pulleys for rotationally supporting said belt and rotating by means of said commodity column-side gear.

7. The automatic vending machine according to claim 2, comprising:

a gear provided for each of said commodity columns for driving said commodity carrying-out mechanism for said commodity column; and a column driving mechanism provided for said commodity receptor, for carrying out said commodity within said commodity column into said commodity receptor by means of said commodity carrying-out mechanism by transmitting a rotating force to the gear of commodity column, wherein said column driving mechanism is constructed by:

a first gear capable of meshing with a commodity column-side gear, a second gear provided on said commodity receptor side for rotation, for meshing with said first gear, a gear supporting member for supporting said first gear on one end side for rotation with the other end side supported for rotation around the rotating shaft of said second gear;

a motor capable of rotating in both forward and reverse directions for rotating said second gear, and pressure contact means for bringing said second gear and said gear supporting member into press contact with each other so as to rotate integrally, and said motor is rotated in a predetermined direction, whereby said first gear is moved on said commodity column side by means of the rotation of said gear supporting member to mesh with said commodity column-side gear, and said second gear is rotated against pressure-contact means while the rotation of said gear supporting member is regulated at a position of the engagement with said commodity column-side gear, while the rotation of said motor is reversed, whereby said first gear is adapted to be moved up to a predetermined position on said commodity receptor side by means of the rotation of said gear supporting member.

8. The automatic vending machine according to claim 7, wherein part of said gear supporting member is formed so as to extend from one side of said second gear to the other side, and between one side of said second gear and a predetermined portion of said gear supporting member, a spring, which forms said pressure-contact means, is interposed in a compressed state.

9. The automatic vending machine according to claim 7, wherein said commodity carrying-out mechanism for each of said commodity columns is constructed by:

an endless-shaped belt, on the upper surface of which said commodity is placed; and a pair of pulleys for rotationally supporting said belt and rotating by means of said commodity column-side gear.

10. The automatic vending machine according to claim 1, wherein at least an abutted portion of said commodity supporting member on said commodity is formed to face obliquely upward toward one end side of said commodity receptor.

11. The automatic vending machine according to claim 10, comprising:

a gear provided for each of said commodity columns for driving said commodity carrying-out mechanism for said commodity column; and a column driving mechanism provided for said commodity receptor, for carrying out said commodity within said commodity column into said commodity receptor by means of said commodity carrying-out mechanism by transmitting a rotating force to the gear of said commodity column, wherein said column driving mechanism is constructed by:

a first gear capable of meshing with a commodity column-side gear;

a second gear provided on said commodity receptor side for rotation, for meshing with said first gear;

a gear supporting member for supporting said first gear on one end side for rotation with the other end side supported for rotation around the rotating shaft of said second gear;

a motor capable of rotating in both forward and reverse directions for rotating said second gear; and pressure-contact means for bringing said second gear and said gear supporting member into press contact with each other so as to rotate integrally, and said motor is rotated in a predetermined direction, whereby said first gear is moved on said commodity column side by means of the rotation of said gear supporting member to mesh with said commodity column-side gear, and said second gear is rotated against pressure-contact means while the rotation of said gear supporting member is regulated at a position of the engagement with said commodity column-side gear, while the rotation of said motor is reversed, whereby said first gear is adapted to be moved up to a predetermined position on said commodity receptor side by means of the rotation of said gear supporting member.

12. The automatic vending machine according to claim 11, wherein part of said gear supporting member is formed so as to extend from one side of said second gear to the other side, and between one side of said second gear and a predetermined portion of said gear supporting member, a spring, which forms said pressure-contact means, is interposed in a compressed state.

13. The automatic vending machine according to claim 11, wherein said commodity carrying-out mechanism for each of said commodity columns is constructed by:

an endless-shaped belt, on the upper surface of which said commodity is placed; and a pair of pulleys for rotationally supporting said belt and rotating by means of said commodity column-side gear.

14. An automatic vending machine, comprising:

a vending machine body having a commodity outlet port at a predetermined position;

a plurality of commodity columns arranged at least in one direction of a widthwise direction and an up-and-down direction of said vending machine body;

a commodity carrying-out mechanism provided for each commodity column respectively, for carrying out a commodity within said commodity column in a predetermined direction;

a commodity receptor capable of receiving a commodity to be carried out of each commodity column; and a moving mechanism for moving said commodity receptor in a direction of arrangement of each commodity column, wherein said commodity receptor is moved to any commodity column by means of said moving mechanism, said commodity within said commodity column is carried out into said commodity receptor by means of said commodity carrying-out mechanism, and said commodity receptor, which has received said commodity, is moved to said commodity outlet port by means of said moving mechanism, further including:

a commodity supporting member provided for said commodity receptor so as to be movable from one end side thereof toward the other end side;

a driving mechanism, which positions said commodity supporting member on the one end side of said commodity receptor to cause a commodity to be carried out of said commodity column to abut on said coinuodity supporting member, and moves said commodity supporting member toward the other end side of said commodity receptor with said commodity supporting member abutted on said commodity;

a gear provided for each of said commodity columns for driving said commodity carrying-out mechanism for said commodity column; and a column driving mechanism provided for said commodity receptor, for carrying out said commodity within said commodity column into said commodity receptor by means of said commodity carrying-out mechanism by transmitting a rotating force to the gear of said commodity column, wherein said column driving mechanism is constructed by:

a first gear capable of meshing with a commodity column-side gear;

a second gear provided on said commodity receptor side for rotation, for meshing with said first gear;

a gear supporting member for supporting said first gear on one end side for rotation with the other end side supported for rotation around the rotating shaft of said second gear;

a motor capable of rotating in both forward and reversed directions for rotating said second gear; and pressure-contact means for bringing said second gear and said gear supporting member into press contact wiot each other so as to rotate integrally, and said motor is rotated in a predetermined direction, whereby said first gear is moved an said commodity column side by means of the rotation of said gear supporting member to mesh with said commodity colunm-side gear, and said second gear is rotated against pressure-contact means while the rotation of said gear supporting member is regulated at a position of the engagement with said commodity column-side gear, while the rotation of said motor is reversed, whereby said first gear is adapted to be moved up to a predetermined position on said commodity receptor side by means of the rotation of said gear supporting member.

15. The automatic vending machine according to claim 14, wherein part of said gear supporting member is formed so as to extend from one side of said second gear to the other side, and between one side of said second gear and a predetermined portion of said gear supporting member, a spring, which forms said pressure-contact means, is interposed in a compressed state.

16. The automatic vending machine according to claim 15, wherein said commodity carrying-out mechanism for each of said commodity columns is constructed by:

an endless-shaped belt, on the upper surface of which said commodity is placed; and a pair of pulleys for rotationally supporting said belt and rotating by means of said commodity column-side gear.

17. An automatic vending machine, comprising:

a vending machine body having a commodity outlet port at a predetermined position;

a plurality of commodity columns arranged at least in one direction of a widthwise direction and an up-and-down direction of said vending machine body;

a commodity carrying-out mechanism provided for each commodity column respectively, for carrying out a commodity within said commodity column in a predetermined direction;

a commodity receptor capable of receiving a commodity to be carried out of each commodity column; and a moving mechanism for moving said commodity receptor in a direction of arrangement of each commodity column, wherein said commodity receptor is moved to any commodity column by means of said moving mechanism, said commodity within said commodity column is carried out into said commodity receptor by means of said commodity carrying out mechanism, and said commodity receptor, which has received said commodity is moved to said commodity outlet port by means of said moving mechanism, further including:

a commodity supporting ng member provided for said commodity receptor so as to be movable in a translatory motion from one end side thereof toward the other end side in said predetermined direction; and a driving mechanism which position said commodity supporting member on the one end side of said commodity receptor to cause a commodity to be carried out of ad commodity column to abut on said commodity supporting member, and moves said commodity supporting member toward the other end side of said commodity receptor with said commodity supporting member abutted on said commodity.

* * * * *

UNITED STATES PATENT AND TRADEMARK OFFICE

CERTIFICATE OF CORRECTION

PATENT NO. : 6,499,627 B2

DATED : December 31, 2002

INVENTOR(S) : Toru Arai

It is certified that error appears in the above-identified patent and that said Letters Patent is hereby corrected as shown below:

Column 9,
Line 6, change “wit” to -- within --.
Line 22, change “wish” to -- with --.

Column 10,
Line 49, change “pressure contact” to -- pressure-contact --.

Column 12,
Line 39, change “coinuodity” to -- commodity --.
Line 63, change “reversed” to -- reverse --.
Line 67, change “wiot” to -- with --.

Column 14,
Line 16, change “carrying out” to -- carrying-out --.
Line 18, add a comma before the word “is”.
Line 21, delete “ng” from between the words “supporting” and “member”.
Line 25, add a comma after the word “mechanism”
Line 25, change “position” to -- positions --.
Line 28, change “ad” to -- said --.

Signed and Sealed this

Sixteenth Day of December, 2003

JAMES E. ROGAN

*Director of the United States Patent and Trademark Office*